United States Patent [19]

Wada et al.

[11] 4,274,115

[45] Jun. 16, 1981

[54] APPARATUS FOR DETECTING RECORDING AND REPRODUCING STATE

[75] Inventors: Ryoichi Wada, Habikino; Takanori Senoo, Katano; Kanji Odagi, Neyagawa, all of Japan

[73] Assignee: Matsushita Electric Industrial Co., Ltd., Osaka, Japan

[21] Appl. No.: 37,331

[22] Filed: May 9, 1979

[30] Foreign Application Priority Data

May 12, 1978 [JP] Japan ................................. 53-56917

[51] Int. Cl.³ ........................ G11B 15/12; G11B 27/36
[52] U.S. Cl. ........................................ 360/62; 360/31; 360/32
[58] Field of Search ........................ 360/62, 32, 31, 53

[56] References Cited

U.S. PATENT DOCUMENTS 3,360,789  12/1967  Yoshii ................................. 360/53
3,863,265   1/1975  Klumpp ............................... 360/62

Primary Examiner—Vincent P. Canney
Attorney, Agent, or Firm—Wenderoth, Lind & Ponack

[57] ABSTRACT

An apparatus for detecting the recording and reproducing state of a video tape recorder used in conjunction with a pulse code modulation adapter and including a signal processor for comparing for a predetermined period data from signals transmitted from the pulse code modulation adapter apparatus to the video tape recorder with data from the signals received from the pulse code modulation adapter apparatus from the video tape recorder and detecting whether the video tape recorder is in the recording or reproducing state in dependence upon the result of the data comparison.

6 Claims, 5 Drawing Figures

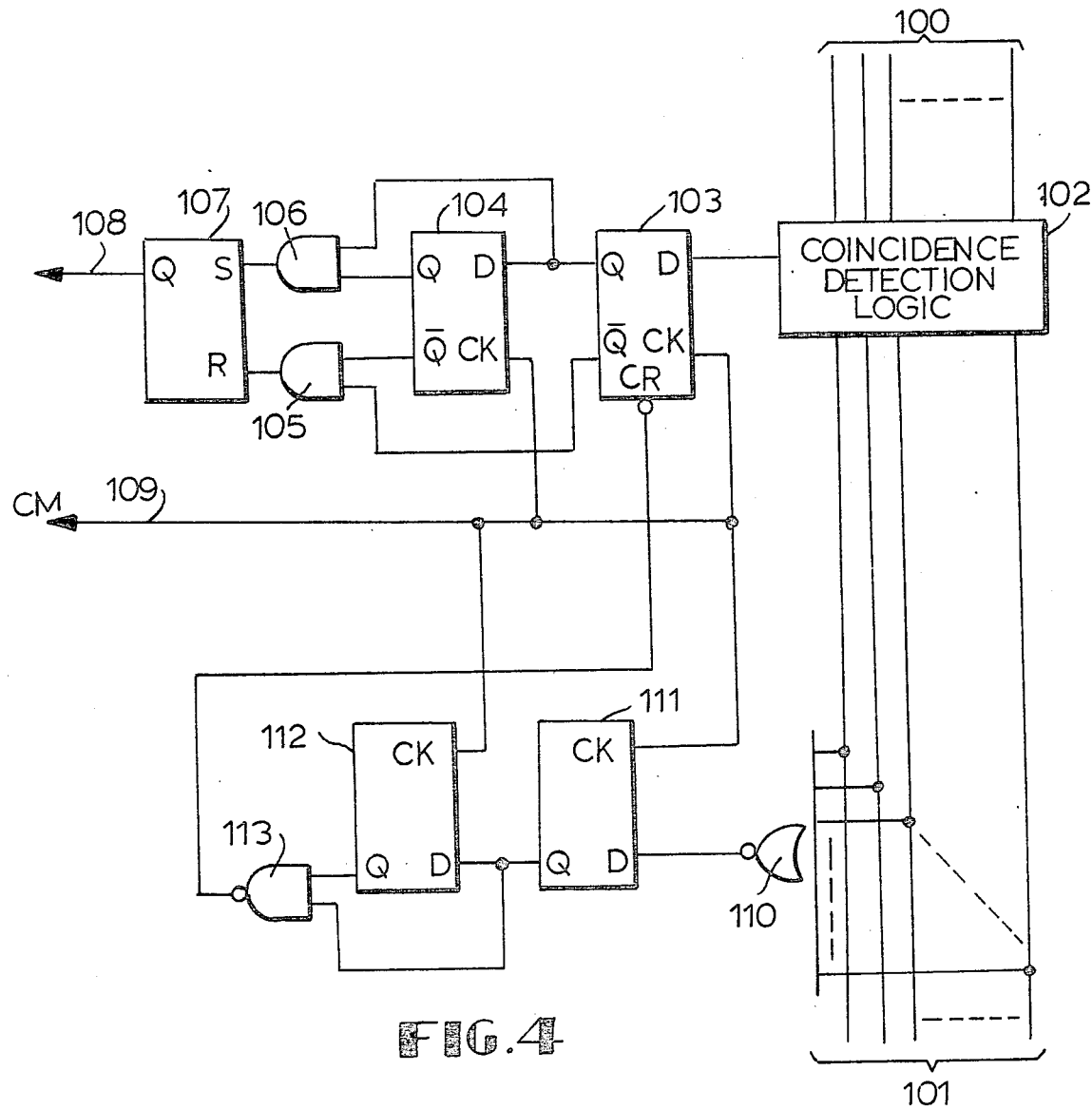
FIG.4
FIG.5a  TRANS. PCM SIGNAL
FIG.5b  CM
FIG.5c  SHCR

APPARATUS FOR DETECTING RECORDING AND REPRODUCING STATE

BACKGROUND OF THE INVENTION

1. Field of the Invention

This invention relates to an apparatus for detecting the recording and reproducing state of a video tape recorder (VTR), which can effectively be used for the case in which audio band signals are first converted to pulse code modulation signals (PCM codes) and then are recorded and/or reproduced by a VTR.

2. Description of the Prior Art

Usually, uniform discrimination signals for indicating whether a VTR is in a recording state or a reproducing state are not produced from the VTR. Therefore, conventionally, a PCM adapter apparatus, which is adapted to the VTR used as a recording/reproducing device and having both a recording circuit and a reproducing circuit therein. These two circuits are continuously operated. Alternatively, the PCM adapter apparatus is further provided with a selection switch for selecting one of the recording and reproducing states the selection switch is manually actuated simultaneously with the manual operation of the VTR. However, in the former case, the amount of hardware for the PCM adapter apparatus is large. In the latter case, the manual operation of the apparatus is relatively complicated. The prior art thus has such disadvantages.

SUMMARY OF THE INVENTION

It is an object of this invention to provide an apparatus for detecting the recording and reproducing state of a VTR such that the disadvantages of the prior art can be eliminated.

According to this invention, the state of a VTR can be automatically detected or discriminated by comparing input data fed from the PCM adapter apparatus to the VTR, with the output data fed from the VTR to the PCM adapter apparatus for a certain time period; the comparison is made utilizing the inherent property of the system wherein the VTR generates as its output the same signals as the recorded signals when the VTR is in the recording state and generates as its output the signals recorded on the recording medium (tape) independently of the input signals when the VTR is in the reproducing state.

BRIEF DESCRIPTION OF THE DRAWINGS

This invention will be described in detail with the aid of the accompanying drawings, in which:

FIG. 4 is a circuit diagram of a main part of a comparator circuit used in the example of this invention; and FIGS. 5 (a), (b), (c) are time charts of timing signals appearing at the certain points of the apparatus.

DESCRIPTION OF THE PREFERRED EMBODIMENT

Hereinafter, this invention will be described with reference to the drawings by using an example in which this invention is used for a 2-channel PCM adapter apparatus.

Figure 1:
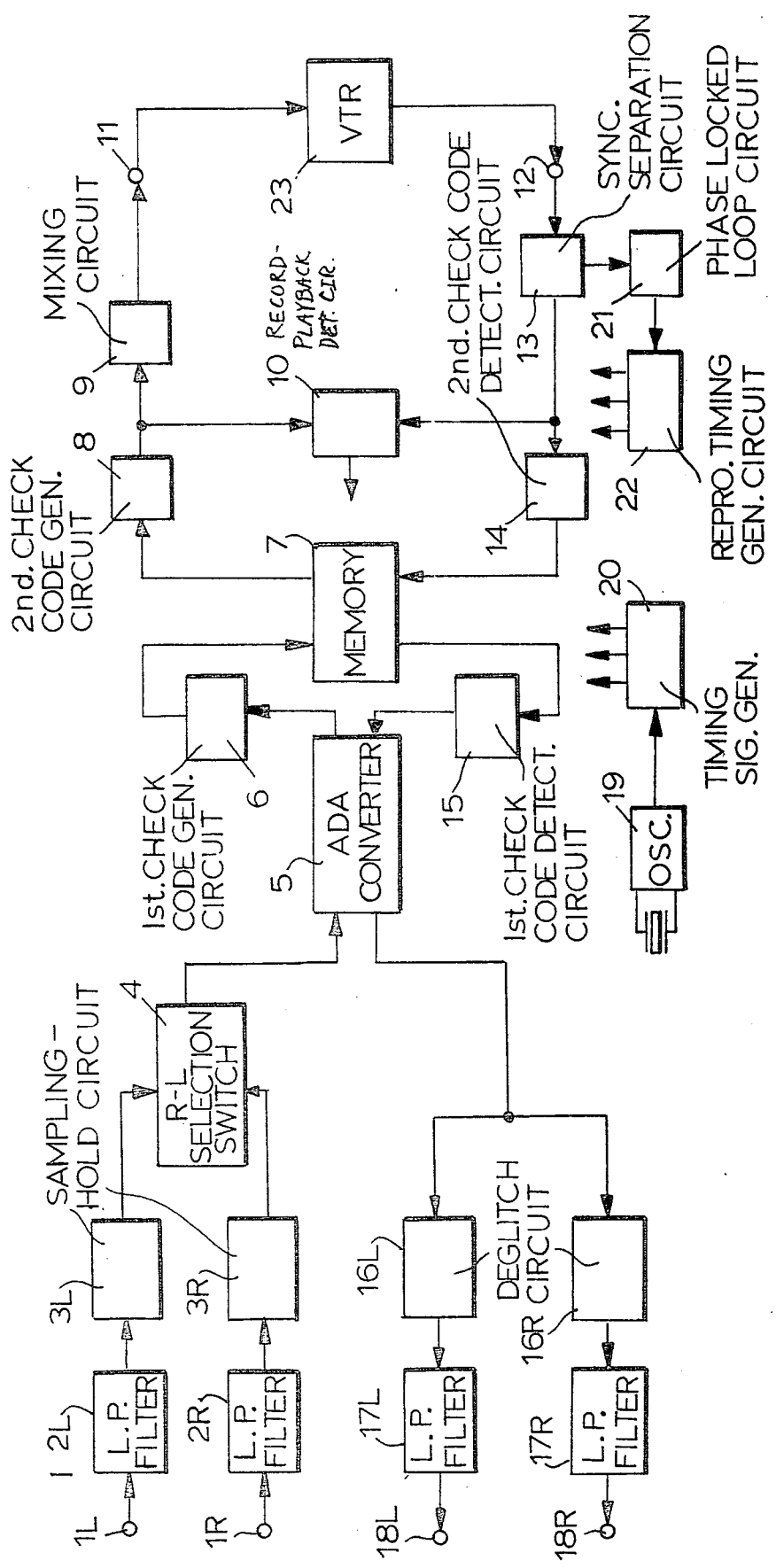
FIG. 1 is a block diagram of a main part of a PCM adapter apparatus employing this invention.

Referring to FIG. 1, a stereophonic left signal and right signal supplied to input terminals 1L and 1R are passed through low pass filters 2L and 2R, respectively, whereby high frequency components in the left and right signals which are likely to cause noise are eliminated. The thus treated signals are alternately sampled by sampling-hold circuits 3L and 3R, respectively, and are then time-division-multiplexed by an R-L selection switch 4, and then fed to an analog-digital-analog (ADA) converter 5. The ADA converter 5 is a circuit designed to operate both as an analog-digital (A/D) converter and a digital-analog (D/A) converter. The choice as to which of the two conversions are selected is made in accordance with the switching between the recording and reproducing states. When the ADA converter operates as an A/D converter, it sequentially converts to digital signals the stereophonic left and right signals which are alternately time-division-multiplexed by the R-L selection switch 4. To the thus obtained digital signals are added first check codes by a first check code generating circuit 6, and the thus treated respective signals are fed to a memory circuit 7, wherein the respective signals are arranged to be interleaved at spaced positions so that successive signals can be spaced from each other.

To the thus interleaved data treated by the memory circuit 7 are added second check codes by a second check code generating circuit 8 the second check codes are added for detecting signal errors caused by drop-out. The thus treated signals with the second check codes are fed to a mixing circuit 9. The mixing circuit 9 adds sync signals (like those provided in television signals) to the signals fed thereto in order to make it possible to record these signals by a usual helical scanning type VTR 23 with rotary heads. The thus mixed signals are fed to the VTR 23 through a terminal 11 and recorded on a magnetic tape through a recording circuit in the VTR which comprises a frequency modulator.

In FIG. 1, element 19 is a quartz oscillator which generates basic clock pulses necessary for producing various timings upon recording. The basic clock pulses are frequency-divided by a timing signal generating circuit 20 into the various timing signals necessary during recording, the timing signals are fed to various points of the apparatus.

The case of recording has been described above. The case of reproducing will be described below.

The output signals of the VTR appearing at a terminal 12 during reproducing have similar waveforms to the above described recorded waveforms, and are supplied to a sync separation circuit 13 which takes out data portions of the supplied signals and feeds them to a second check code detection circuit 14.

The second check code detection circuit 14 checks the second check codes contained in the reproduced signals to check whether the reproduced data has signal errors caused by drop-out. The data signals and the results of the checking are written in the memory circuit 7.

Upon reproducing, the above memory circuit 7 de-interleaves respective data and expands the data as to time axis. The memory circuit 7 also removes time axis ripples (e.g. jitter), if any. Therefore, the read out outputs have no data drop-out and no time axis components. The output signals from the memory circuit 7 are fed to a first check code detection circuit 15 which corrects errors in the stereophonic signals, if any, by means of the first check codes. The corrected stereophonic signals are applied to the ADA converter 5. This ADA converter operates as a D/A converter during reproducing, and converts sampled data in digital signal form (i.e. the output signals from the first check code detection circuit 15) to analog signals, which are then supplied to deglitch circuits 16L and 16R. The deglitched signals are passed through low pass filters 17L and 17R, respectively, whereby undesired frequency components are eliminated. The thus treated signals are then fed to output terminals 18L and 18R.

Meanwhile, the sync signals separated by the sync separation circuit 13 from the reproduced signals are fed to a phase-locked loop (PLL) circuit 21, and are multiplied and fed to a reproduction timing generation circuit 22 for generating timing signals necessary for reproduction operation; such timing signals are applied to various points of the apparatus.

If the recording/reproduction is performed using a helical scanning type VTR with 2 rotary heads for the VTR 23, the signals to be treated are similar to television signals from the view point of treatment of clamp by the recording/reproduction circuit in the VTR and the view point of skew at the head switching portion. That is, the signals need to contain horizontal sync signal-like signals and vertical sync signal-like signals. However, these signals are not necessary to be completely equivalent to the television signals, and can be selected to be quite different from television signals as long as such selected signals do not impair the operation of the recording/reproduction system in the VTR.

Figure 2A:
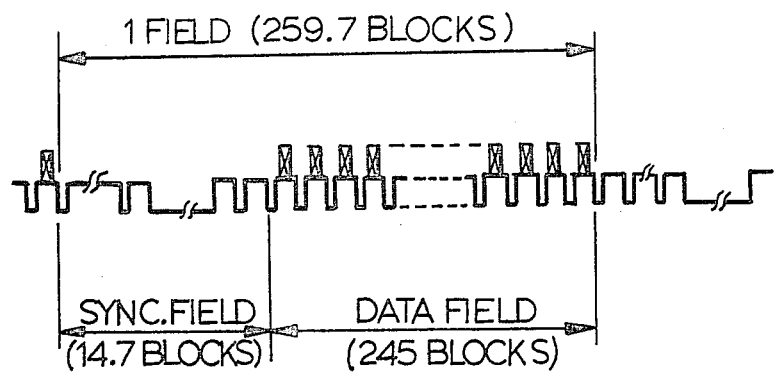
FIGS. 2 (A), (B), (C) are graphs showing waveforms of recorded signals in FIG. 1.
Figure 2B:
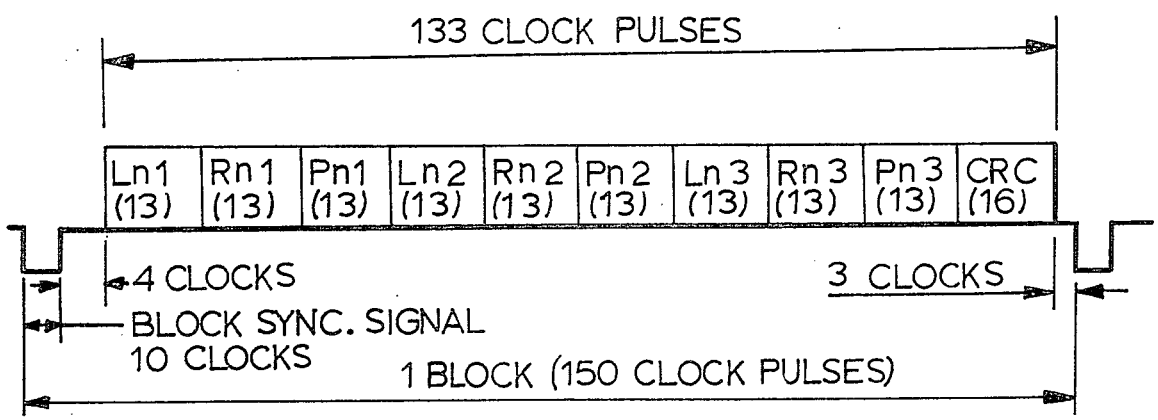
Figure 2C:
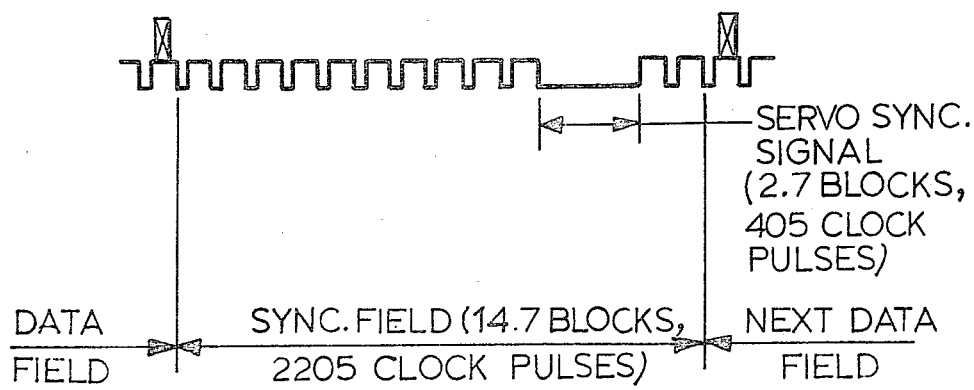

FIGS. 2a–2c are graphs showing the waveforms of the main portions of such selected signals. The signal example of FIG. 2a has a data rate of about 2.335 MHz, wherein one field is composed of 38955 clocks and is exactly the same as one field period (16.683 ms) of a standard NTSC television signal. Those blocks which correspond to H sync signals in television signals are block sync signals, each field consisting of 259.7 blocks. Out of this 259.7 blocks, 245 blocks are used for data, the remaining 14.7 blocks being used for sync field.

FIG. 2b shows how much of a portion of one block is used for data. The data occupies 133 clocks out of 150 clocks of one block, and the data consists of 13 data bits $L_{n1}$, $R_{n1}$, $L_{n2}$, $R_{n2}$, $L_{n3}$, $R_{n3}$ obtained by digitalizing left and right channel signals, 13 bit first check codes $P_{n1}$, $P_{n2}$, $P_{n3}$, and a 16 bit cyclic redundancy check code (CRC) which is the second check code. Therefore, one field has 735 data bits for the left and right channel signals, and the transfer rate for transferring blocks is 44.056 KHz.

On the other hand, the sync field is used for the head switching of VTR and for the supply of reference signals for servo control. As shown in FIG. 2c, the servo sync signal which corresponds to the vertical sync signals of television signals is composed of 2.7 blocks. The empty blocks (no data blocks) before the servo sync signals are 10 blocks, and the empty blocks after the servo sync signals are 2 blocks. In total, the sync field is composed of 14.7 blocks.

The head switching in the case of a helical scanning type VTR with 2 rotary heads is usually effected within this 10-block period before the servo sync signal, so that the head switching does not severely affect the data field.

The ADA converter 5 and the memory circuit 7 are used both for the recording and the reproducing operations. They must therefore be switched in operation between recording and the reproducing. According to the embodiment shown here, this switching is done by a recording/reproducing (record-playback) detection circuit (REC-PB detection circuit) 10.

The REC-PB detection circuit 10 compresses the output data of the second check code generator and the output data of the sync separation circuit 13, for one field respectively, by means of a 16-bit linear feedback shift register, and carries out the REC-PB detection by comparing the two compressed data words. That is, when the VTR 23 is in a recording state, the VTR 23 records the signals of the terminal 11 on the tape, and at the same time feeds the same signals to the terminal 12. In this case, the two data words, as defined above, are the same, and also the two compressed signals formed by the linear feedback shift register (the thus compressed signals being called signature signals hereinafter) are the same.

On the other hand, upon reproducing, the VTR feeds the signals recorded on the tape to the terminal 12. So the two signature signals (two compressed signals) are naturally different from each other.

The REC-PB detection circuit 10 continuously compares the two kinds of signature signals. When the two compared signature signals are the same, it means that the VTR is in a recording state, and the circuit 10 brings the state of each of the ADA converter 5 and the memory circuit 7 to their proper recording operation mode. On the other hand, when the two compared signature signals are different from each other, it means that the VTR is in a reproducing (playback) state, and the circuit 10 brings the state of each of the ADA converter 5 and the memory circuit 7 to their proper reproducing operation mode.

Figure 3:
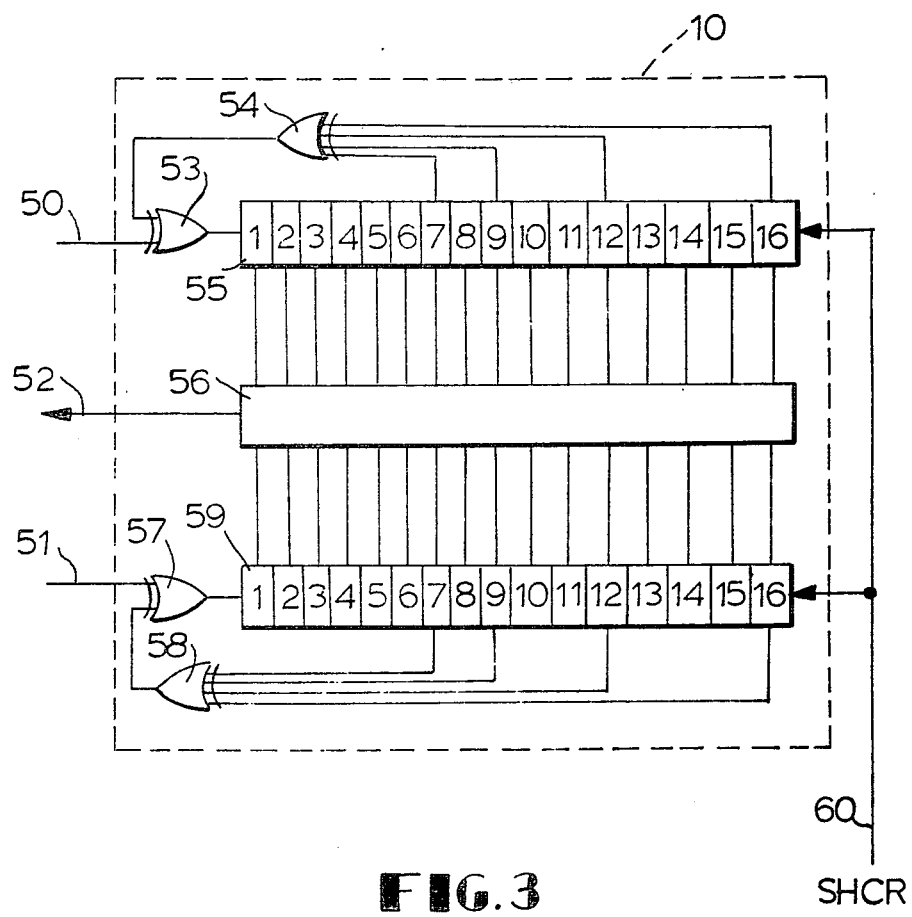
FIG. 3 is a circuit diagram of a main portion of an example of a recording/reproducing detecting apparatus according to this invention.

FIG. 3 shows an example of the REC-PB detection circuit 10. Referring thereto, the data to be written, (including the CRC added thereto by the second check code generating circuit 8 of FIG. 1), is applied to an input line 50 of FIG. 3. On the other hand, the output signals from the VTR 23 are applied to the sync separation circuit 13 which separates the data portion of the output signals of the VTR; the thus obtained data portion is fed to an input line 51 of FIG. 3. The shift registers 55, 59 are respectively in linear feedback loops comprising exclusive OR circuits 53, 54 and 57, 58, and divide the input data streams by the polynominal:

$$X^{16}+X^{12}+X^9+X^7+1$$

After the division is carried out for the data for one field:

$$133 \times 245 = 32585 \text{ (bit)},$$

the respective remainders remain in the shift registers. These remainders can be regarded as signals produced by always compressing input data streams to 16-bit, and thus are called signature signals.

A comparator circuit 56 compares these two signature signals, and determines whether the output signals of the VTR are the same as the output signals of the PCM adapter apparatus (namely, the VTR 23 is in a recording state), or completely different data are produced at the output of the VTR 23 (namely, the VTR 23 is in a reproducing state). The comparator circuit 56 produces the resultant signal of the comparison (determination) at an output line 52.

An example of circuit arrangement of the comparator circuit is shown in FIG. 4. Referring thereto, signature signals of the output data of the PCM adapter apparatus are supplied to input lines 100, and the signature signals of the data of input signals of the PCM adapter apparatus are supplied to input lines 101. A coincidence detection logic 102 connected to a D-type flip-flop circuit 103, produces a "0" signal at its output only when both signature signals coincide with each other.

The D-type flip-flop circuit 103 receives the output signal of coincidence detection logic 102 by means of a CM signal supplied to a signal line 109, and holds the same output signal. Another D-type flip-flop circuit 104 holds a signal representing the result of the previous comparison. That is, when a result of a comparison between new signature signals is fed to the flip-flop circuit 103, the then held comparison result at the flip-flop circuit 103 is transferred to and held by the flip-flop circuit 104. AND gates 105 and 106 produce signals, respectively, at outputs thereof when both of two successive comparison results indicate either signature coincidence or signature non-coincidence (disagreement), and are thereby used to set or reset a set-reset flip-flop circuit 107, respectively. The signal appearing at an output line 108 of the flip-flop circuit 107 is the recording/reproducing detection signal.

A NOR gate 110 is provided for detecting that all of the input signals of the PCM adapter apparatus are "0". Upon recording, when no recorded signals appear from the VTR or when the output signals of the VTR are not connected to the PCM adapter apparatus, all the signature signals become "0". If such states occur twice successively, the D-type flip-flop circuit 103 is cleared by D-type flip-flop circuits 111, 112 and a NAND gate 113, so as to detect the operation state as a recording state even if the above-mentioned two signature signals do not coincide with each other.

In this case, depending on how the circuits such as sync separation circuit 13 of FIG. 1 are constructed, the signature signal is not always "0" when there is no input signal. But even in such a case, if the signature signal in such case is preliminarily known, satisfactory detection of recording/reproduction state can be performed by using, instead of the NOR gate 110, a gate circuit for detecting such a known signature signal. More generally, circuits can be designed to supply abnormal input signals to the PCM adapter apparatus when the same signature signals occur, to thereby indicate the state as a recording state. Both the former and the latter methods can be achieved by conventional techniques. So, detailed descriptions therefor are omitted here.

Further, the coincidence detection logic 102 can be formed by commercially available IC's, and its construction is thus known. So, detailed description is omitted here.

According to the above described example of this invention, data of one field is data-compressed to 16 bits. This means that the above described comparison operations are required to be performed about 216,000 times per hour. Since data of 32,585 bits is compressed to 16 bits, it is natural that different data streams have the same signature signals. But, as evident from the following explanation, the probability of such occurrence is negligibly low. That is, there are $2^{16}$ different kinds of signature signals of 16 bits. Assuming that the respective signature signals corresponds to the same number of input data words, the probability that different input data words resulting in the same signature signal is $2^{-16}$, namely 0.0015%. This means that the same signature signal is produced from different input data words at a probability of 3.3 times per hour. However, the probability that the production of the same signature signal from different input data words occur twice successively is only once per 19,884 hours. Thus, the present apparatus for detecting the recording/reproducing state is sufficiently reliable.

FIGS. 5a, 5b, and 5c show time charts of a transmitted PCM signal, a CM signal and a SHCR signal (which is a signal supplied to the input line 60 of FIG. 3 and is used for clearing the shift register in order to compress the data of a field after the comparison for the data of the previous field has been completed). As apparent from FIG. 5, the comparison of signature signals and the clearing of the shift register are carried out near the servo sync signal.

It is not necessary for the data compression to be limited to that for one field. The data compression can be done for another spontaneous time period. However, the one field data comparison is preferable, because there is no input data in the sync field, and the circuit arrangement can be relatively simple in the case of one field data compression.

Furthermore, although in the above embodiment all the data in one field is compressed to signature signals of 16 bits, partial data compression can be performed. For example, a portion of data for each block, e.g. only the CRC portion, can be compressed for one field and subjected to the comparison.

It is also apparent that the data compression is not necessary. That is, spontaneously taken data can be compared without subjecting it to data compression, so as to determine whether they are the same.

Besides, it should be noted that upon data compression, the polynominal for the division should be different from the CRC polynominal. Otherwise, the signature signal becomes "0" for every block.

As evident from the foregoing, this invention provides an apparatus for reliably detecting the recording-/reproducing state of a VTR by treating electric signals only. The circuit/arrangements does not require capacitors or other analog circuit elements, and thus can easily be formed as LSI's. This invention is effective for minimizing the hardware cost of the PCM adapter apparatus and for making easy manual handing of the apparatus.

What is claimed is:

1. In a pulse code modulation adapter apparatus used with a video tape recorder for converting audio band signals to pulse code modulation codes used for recording and reproduction, an apparatus for detecting recording and reproducing state, comprising signal processing means for comparing for a predetermined period data from signals transmitted from the pulse code modulation adapter apparatus to the video tape recorder with data from the signals received by the pulse code modulation adapter apparatus from the video tape recorder, wherein the result of said data comparison is used for detecting whether the video tape recorder is in the recording or reproducing state.

2. Apparatus for detecting recording and reproducing state according to claim 1, wherein said signal processing means comprises a pair of linear feedback shift registers and a comparator circuit for comparing data in one of said registers with data in the other of said registers, wherein output data of the pulse code modulation adapter apparatus is supplied to one of said registers, and input data of the pulse code modulation adapter apparatus is supplied to the other of said registers, the state of the video tape recorder being detected by comparing for said predetermined period the data in said two registers by means of said comparator circuit to discriminate whether the data in said two registers are the same.

3. Apparatus according to claim 2, wherein said predetermined period is set to be one field.

4. Apparatus according to claim 2, wherein said comparator circuit provides a detecting signal used to indicate the recording state of the video tape recorder when the data in said two registers are determined to be the same by the comparison thereof for at least two successive predetermined periods.

5. Apparatus according to claim 4, wherein after the state of the video tape recorder is detected as the recording state, the video tape recorder is detected as being in the recording state unless the data in said two registers is determined different by the comparison thereof for at least two successive predetermined periods.

6. Apparatus according to claim 2, wherein when one of said registers to which the input data of the pulse code modulation adapter apparatus is supplied has the same data for at least two successive predetermined periods, the video tape recorder is detected as being in the recording state.

* * * * *